United States Patent [19]

Levy

[11] 4,034,409

[45] July 5, 1977

[54] METHOD AND APPARATUS FOR MAGNETICALLY RECORDING GRAPHIC INFORMATION

[76] Inventor: Sidney Levy, 145 W. Cuthbert Blvd., Oaklyn, N.J. 08107

[22] Filed: Apr. 16, 1975

[21] Appl. No.: 568,705

[52] U.S. Cl. .............................. 358/301; 346/74.1

[51] Int. Cl.$^2$ .............................. H04N 1/22

[58] Field of Search .............................. 178/6.61, 6.6 A; 346/74.1; 360/110, 111, 114, 115, 116, 119, 120, 121, 123, 125, 126

[56] References Cited

UNITED STATES PATENTS

| | | | |
|---|---|---|---|
| 2,657,377 | 10/1953 | Gray | 360/116 |
| 2,900,443 | 8/1959 | Camras | 360/116 |
| 2,933,555 | 4/1960 | Wootten | 178/6.6 A |
| 2,979,572 | 4/1961 | Levin | 360/116 |
| 3,110,764 | 11/1963 | Barry | 178/6.61 |
| 3,318,997 | 5/1967 | Camras | 360/121 |
| 3,611,421 | 10/1971 | Benoit | 178/6.61 |
| 3,651,262 | 3/1972 | Korpel | 178/6.6 A |
| 3,852,525 | 12/1974 | Ichioka et al. | 178/6.61 |

*Primary Examiner*—Raymond F. Cardillo, Jr.
*Attorney, Agent, or Firm*—Friedman, Goodman & Teitelbaum

[57] ABSTRACT

An imaging system is provided whereby graphic information from a source is magnetically recorded on a receiving surface. The imaging system comprises shaping a magnetic field to substantially linear configuration and varying the intensity of the magnetic field along said line in accordance with information contained in a corresponding line of the source of the original graphic information. Toner material is disposed in magnetically attractable relation to the magnetic field for causing transfer of toner material to a receiving surface in a quantity corresponding to the variations of the magnetic field intensity along the line so that a record thereof is made upon a receiving surface interposed between the magnetic field and the toner supply.

27 Claims, 9 Drawing Figures

METHOD AND APPARATUS FOR MAGNETICALLY RECORDING GRAPHIC INFORMATION

BACKGROUND OF THE INVENTION

1. Field of the Invention

The subject invention relates to the magnetic recording of images utilizing a linear magnetic field, the intensity of said field along said line being varied in accordance with the graphic information to be recorded so as to produce a line of recorded information, corresponding in a pattern of light and shade to the information source. Continuously progressive recordation lines of information is thus possible for producing an integrated record of the source material in a direction normal to the linear magnetic field.

2. Description of the prior art

Magnetic imaging has been subject to investigation in recent years since the development of a successful and acceptable system is considered have advantages over imaging techniques currently employed on a commercial basis. It has been felt that such techniques would avoid the exclusive and potentially dangerous high voltage equipment now required in electrostatic xerography and related techniques. Such system would also be desirable since it would avoid the use of chemical processing steps now required in photographic systems.

It does not appear that any satisfactory and commercially acceptable system has yet been developed utilizing magnetic techniques.

SUMMARY OF THE INVENTION

Accordingly, it is an object of the present invention to provide an imaging system which avoids the problems of prior art systems.

A further object of the present invention is to provide an imaging apparatus which magnetically records graphic information from a source onto a receiving surface on a line by line basis.

Still a further object of the present invention is to provide imaging apparatus to which shapes a magnetic field substantially linear configurations and varies the intensity of the magnetic field along the line in accordance with information contained in a corresponding line of the source of the original graphic information.

A further object of the present invention is to provide an imaging apparatus which utilizes a unique copying head to form a shaped magnetic field along a substantially linear configuration, so that variations in the magnetic field intensity correspond to the information contained in a source of graphic information.

Still another object of the present invention is to provide an imaging apparatus utilizing magnetic techniques to form a record of graphic information onto a receiving surface, by transferring toner material onto the receiving surface in a quantity corresponding to variations in a magnetic field intensity.

A further object of the present invention is to provide a method for recording graphic information from a source of information onto a receiving surface by varying the intensity of linear magnetic field in accordance with a line of information from the source and using magnetic techniques to record the variations onto a receiving surface.

Yet another object of the present invention is to provide a unique toner supply for use with an imaging apparatus such that the toner will form a record in a receiving surface without the need of a separate fixer.

These and other objects, features and advantages of the invention, will, in part, be pointed and with particularity, and will, in part, become obvious from the following descriptions of the invention, taken in conjunction with the accompanying drawings which form an integral part thereof.

Briefly, the invention describes an imaging apparatus for recording graphic information from an original onto a receiving surface, comprising means for providing a magnetic field. A shaping means then shapes the magnetic field to a substantially linear configuration. An electrical means varies the intensity of the magnetic field along the line, in accordance with information contained on a corresponding line of the original graphic information. Toner supply means is positioned in juxtaposition to the shaping means and in magnetically attractable relations to the field for causing a transfer of toner material from the toner supply means to the receiving surface in a quantity corresponding to the variations of the magnetic field intensity along the line.

The invention also describes a method for recording graphic information from an original onto a receiving surface. Also described is a toner supply means for use with an imaging apparatus.

BRIEF DESCRIPTION OF THE DRAWINGS

With the above and additonal objects and advantages in view, as will hereinafter appear, this invention comprises the devices, combinations and arrangements of parts hereinafter described by way of example and illustrated in the accompanying drawings of a preferred embodiment in which.

In the various figures of the drawings, like reference characters designate like parts.

DESCRIPTION OF THE PREFERRED EMBODIMENT

Figure 1:
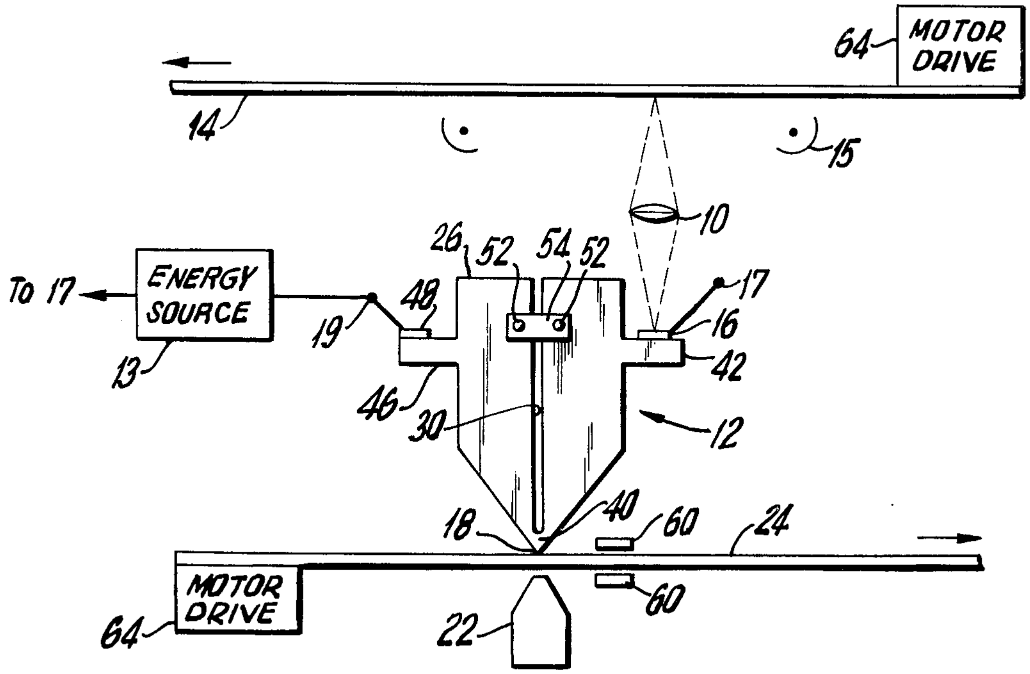
FIG. 1 is a schematic drawing of an apparatus in accordance with an embodiment of the present invention.
Figure 2:
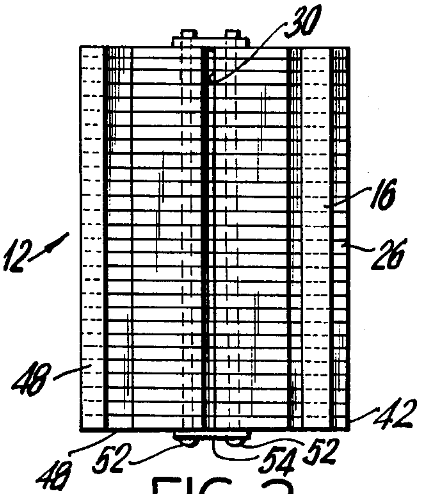
FIG. 2 is a top view of the recording head as viewed in the direction of the arrows 2—2 in FIG. 1.
Figure 3:
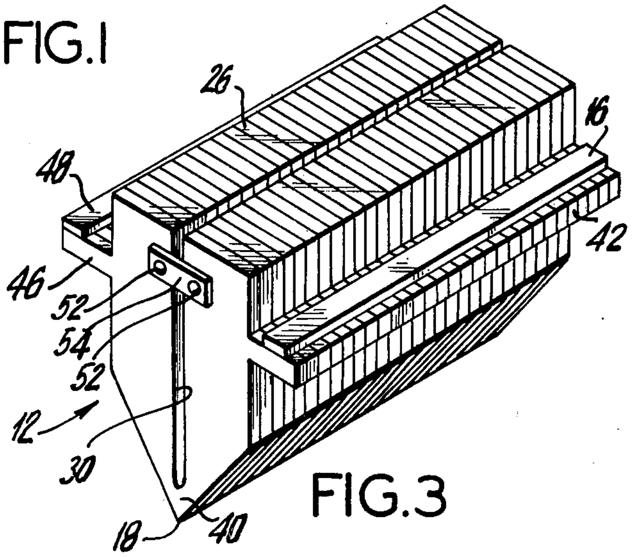
FIG. 3 is a perspective view of a copy head in accordance with an embodiment of the present invention.

Referring now to the drawings, FIG. 1 illustrates an embodiment of the present invention wherein an optical system 10 is utilized for activating a recording head 12 embodying significant features of the present invention. A line of graphic information appearing on a sheet of source material 14 is illuminated by the illumination source 15 and optically focused on a photo-responsive material 16 which is in electrical contact with the laminar structure comprising the recording head 12. As will hereinafter be more particularly described, the arrangement is such that the laminar stack comprising the recording head is magnetically energized to produce a shaped magnetic field of uniform intensity along a line defined by the tips 18 of the laminae assembled as a stack. Variations of light and shade optically derived from a line of the graphic source material 14 are focused upon the photo-responsive material 16. The laminae comprising the stack are of bifurcated configuration and the body portions of adjacent laminar elements are electrically insulated from each other. A source of current 13 is connected to the photo-responsive element so as to provide for the passage of current from a source terminal 17 through said photo-responsive element and each individual bifurcated laminae comprising the stack, to a common terminal 19 connected to said current source. As a consequence of this arrangement, each of the laminae is connected in series circuit with the current source through the photo-responsive element and the laminae are in parallel circuit arrangement with respect to each other.

As a consequence of this arrangement, the amount of current flowing through the body of each of the laminae is determined by the degree of illumination of the portion of the photo-responsive element associated therewith and varies along the line defined by said photo-responsive element in accordance with the pattern of light and shade corresponding to the source material. As will hereinafter more particularly be pointed out, the current flow through each of the laminae increases the magnetic reluctance thereof and results in an overall diminution of the magnetic field in the tip region. As a consequence of this arrangement, toner material from the toner supply 22 is attracted toward the tip portion of the magnetic field in accordance with the degree of intensity of the resultant magnetic field wherein areas of higher illumination cause less or no toner material to be attracted. Consequently, toner material will impinge upon the surface of a receiving medium 24 such as a sheet of paper interposed between the tip of the recording head and the toner supply and can be fixed in the manner hereinafter to be described.

Figure 6:
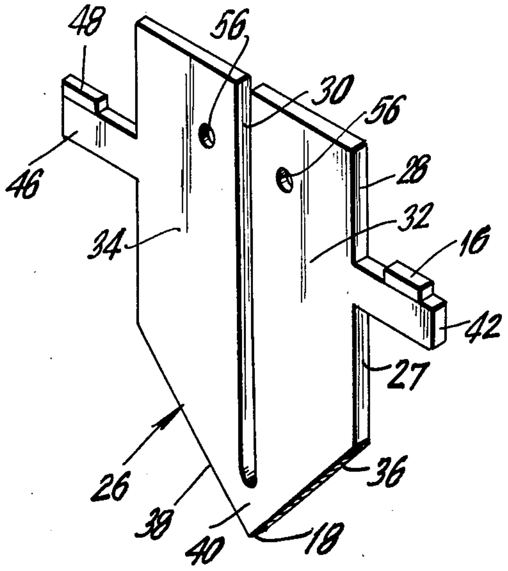
FIG. 6 is a perspective view of an individual lamina in accordance with the present invention.

A recording head in accordance with the present invention designated generally by the numeral 12 is comprised of a plurality of laminations 26 assembled to form a stack. Said laminae are each formed of a relatively thin sheet of magnetically permeable electrically conductive material. As more particularly shown in FIG. 6, each of said laminae is provided with a body portion 27 from which there extends a head portion 28 which is almost completely bisected by means of a narrow slit 30 to form a bi-furcated planar element comprised of a pair of leg portions 32 and 34. Slit 30 terminates just short of the tip 18 at the apical portion of each laminae. Said tip or apercal portion is formed by the progressive reduction of the transverse dimension of each lamina as indicated at 36 and 38. The slit electrically isolates the two leg portions while electrical continuity between the legs is provided by the bight or small bridging portion 40 of the laminar material remaining at the tip. A laterally projecting tongue 42 is provided along one of the legs which carries a photo-responsive element 16. A projecting tongue 46 is similarly provided on the opposite leg. The photo-responsive element 16 and the legs are serially connected to a source of electrical energy by means of the positive and negative terminals connected to the photo-responsive element 16 and a bus bar 48 respectively. The photo-responsive element and bus bar are advantageously unitary structures extending along the entire length of the tongue portions respectively so that a single connection to the source of electrical energy suffices for each.

Figure 7:
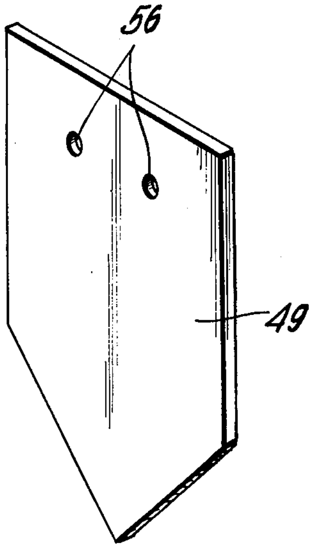
FIG. 7 is a perspective view of a separator element.

A separating element which may be in the form of a sheet of electrical insulating material 49 as shown in FIG. 7, is disposed between adjacent laminae. The laminae and interposed insulating elements are assembled as a stack and held in assembled form by means of tie rods 52 of electrical insulating material, the ends of which are tied together by transverse straps 54 of similar material securing the opposite ends of the rods to each other. Suitable apertures 56 are provided in the laminae and spacer elements to permit the passage of the rods. A thin layer of electrically insulating lacquer may be deposited on each of the laminae in place of the insulating element of sheet material.

The laminae forming the stack are made of a magnetically high permeable material, such as silicon, iron or high permeability nickel alloy. The resolution of the magnetic field imaging apparatus depends upon the thickness of the laminations in the stack and their interposed insulation. The photo-responsive element is preferably one which has higher conductivity in one direction, and this preferred direction of conductivity is such that it is in the plane of the laminations. Such a material can be, by way of example, a single crystal cadmium sulfide material which is properly doped. Alternative, it can be a silicon photo-transistor material. The structure can be a single photo-responsive element, in electrical contact with all of the laminations forming the recording head or, if desired, a plurality of photo-responsive elements may be utilized each of which is in electrical contact along one of its surfaces with the projecting tongue of an associated laminae.

Figure 8:
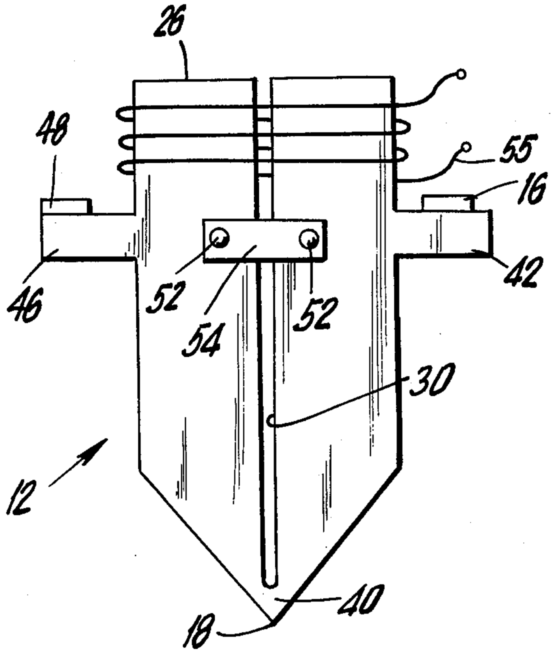
FIG. 8 is an elevational view of a copy head with a coil supplying the magnetic field.
Figure 9:
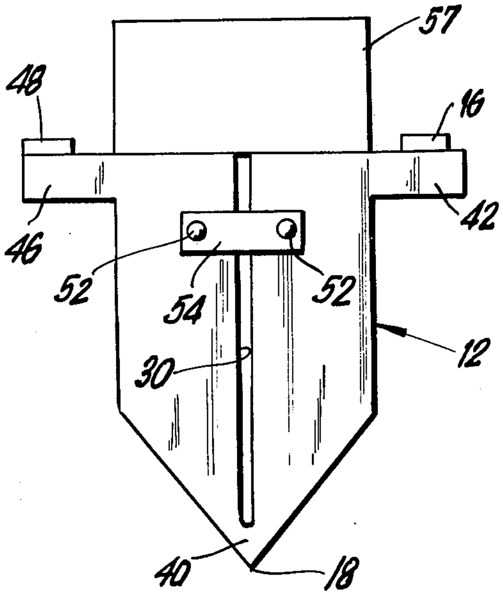
FIG. 9 is an elevational view of a copy head with a permanent magnet supplying the magnetic field.

The stack is magnetized to form the desired shaped linear magnetic field along the tip portion of the head. This may be accomplished by suitably magnetizing the stack as a whole or each of the laminae in permanent form or by magnetically energizing the stack as a whole as by passing a suitable current through a coil 55 surrounding the body portion of the stack, as shown schematically by FIG. 8 or by contact with a permanently magnetized mass 57, as shown in FIG. 9. The magnetic energizing coil may be fed by direct, alternating current, or by pulsed current of suitable waveform. It should also be noted that the photo-responsive element need not necessarily be positioned on a projecting tongue but may be otherwise disposed so as to provide a series current path which leads from the photo-responsive element to one leg of the stack, through the bridging tip portion and through the other leg to the opposing electrical terminal.

The magnetic field producing means, whether it be by permanent magnetization of the stack, as by an associated permanent magnet extending the length of the stack, or a magnetizing coil passing through the lamination stack, is substantially restricted to the tip line extending the length of the stack.

As heretofore indicated, the photo-responsive material 16 is part of a series circuit, which permits current to pass from one terminal 17 connected to the current source through the photo-responsive element, down one leg 32 of the head laminae, across the reduced tip or bridging portion 40 back up the other leg 34 of the head to the other terminal 19 connected to the current source. This current source may be a direct current source, an alternating current source, or a pulsed current of suitable waveform. The photo-responsive element 16 is such that it permits passage of high current in the areas where it is illuminated, while producing a relatively weak current in the areas of little or no illumination. The current from the source passes through the photo-responsive element 16 and then passes in parallel relation through each electrically conductive laminae. Those laminae connected to the portions of the photo-responsive element which are highly illuminated will therefore carry a higher current than those laminae connected to the portions of the photo-responsive elements which are not as highly illuminated by portions of the line image focused thereon from the source material 14 through the optical system 10. The current thus produced in each of the laminae must pass through the restricted tip portion 40 of each laminae. The current density is very high in the tips of those laminae corresponding to strong illuminations, and is low in those laminae corresponding to low illumination. The magnetic field produced by this high current density is at right angles to the magnetic field produced by the shaped magnetic field producing means heretofore described. The magnetic field produced by the current magnetically saturates the material of the laminae, the laminae being made of a magnetically permeable material of suitable characteristic. The degree of saturation is related to the current level controlled by the associated portion of the photo-responsive element under image illumination. The result is that the reluctance of each of the laminae corresponding to a high illumination level on the photo-responsive element is increased particularly at the tip portion thereof, and the magnetic field at the tip of the laminae is sharply reduced. As a consequence, the variations of light and shade of the image source viewed through the optical system is reproduced as a magnetic field along the scan line at the tip of the laminations. This field varies along the scan line in accordance with the light and shade pattern of the image and penetrates the receiving medium such as a sheet of paper diposed under the tips. Toner material from the toner supply 22 is thus attracted causing it to impinge against and form a recorded image on the receiving means. As the receiving means (such as a sheet of paper) moves past the head, a suitable fixer 60 applies heat or a strong high frequency field to permanently fix the toner onto the receiving means.

Figure 4:
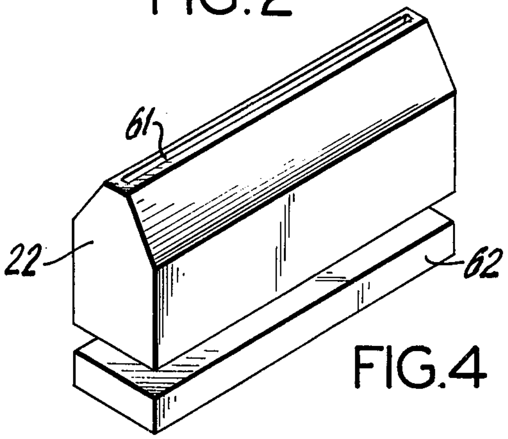
FIG. 4 is a perspective view of a toner supply in accordance with the present invention showing an optional heater in position.
Figure 5:
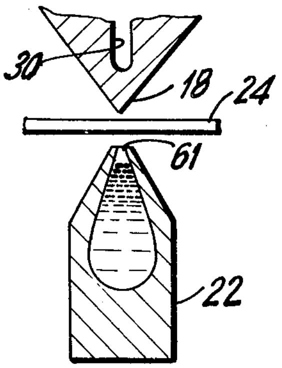
FIG. 5 is a cross-sectional view of the toner supply.

A thin line of toner material is thus deposited on the receiving medium to form the recorded image on the receiving medium. The toner is advantageously a magnetic ink which is contained in a toner supply receptacle 22 as shown in FIG. 4. The container is formed of a non-magnetic material and preferably has the tear-drop cross-sectional configuration shown in FIG. 5 to thereby provide a narrow slot-like exit point 61 for the toner material. The toner material may also be comprised of a magnetic powder dispersed in a carrier such as a low melting point wax or the like. As shown in FIG. 4 in said case heater means 62 are provided for the toner supply to maintain the toner in melted or liquid condition. The toner is thus attracted to the confronting surface of the receiving medium while in liquid form. When the toner strikes the receiving medium it is cooled and solidifies. By this means the additional fixing step and apparatus may be eliminated. The quantity of toner deposited on the surface is a function of the intensity of the magnetic field.

The original source material is progressively copied in full width and the image is reproduced onto the receiving means. Accordingly, the original and the receiving means are moved in synchronism by drive motors 64 at the same rate. The original and the receiving means are shown as being moved in opposite directions to compensate for the reversal of the image due to the optical system employed. However, using other optical systems, it would be possible to have both the original and receiving means move in the same direction.

The optical system 10 can either be one which focuses only a single line of the original information onto the photo-responsive element, or alternately, the system can focus an entire area of the original source material. However, the photo-responsive element in such case should be narrow enough to receive a single line of the original information or a suitable arrangement such as a slotted mask may be provided for this purpose. A very thin or narrow line of toner is thus deposited to form the recorded image on the receiving means. The toner can be a magnetic ink, which is advantageously initially in liquid form. In one embodiment, the toner includes a magnetic ink in a carrier medium, such as low melting wax. The toner is maintained in a liquid state, as for example, by means of a heater. The toner is thus attracted onto the receiving means surface in a liquid form. When the toner strikes the receiving means, it solidifies by cooling. In this manner, no additional fixing step is needed and a permanent image will be formed directly by use of the toner supply itself.

The essential characteristic of the invention is the provision of means for shaping a magnetic field and further providing electrical means for varying the intensity of said magnetic field along said line, which line by line progressively forms a recorded image on a receiving surface corresponding to the light and shade patterns of the original source material. The magnetic field is applied along a line transverse to the receiving surface, or its direction of travel, and the recorded image is progressively generated by passing the receiving surface across the line of magnetic information. The intensity of the magnetic field is varied along the line by altering the reluctance of the magnetic circuit by passing a current through the individual laminae. The amplitude of said current being determined by a photo-responsive element responsive to the illumination produced by the light and shade pattern of the original source material to be copied. The reluctance of the magnetic circuit is caused to change in response to the current level by causing magnetic saturations of the magnetic materials in varying degrees as a result of the magnetic field generated by the current flow.

There has been disclosed heretofore the best embodiments of the invention presently contemplated. However, it is to be understood that various changes and modifications may be made thereto without departing from the spirit of the invention.

What is claimed is:

1. An imaging apparatus for line by line recording of graphic information from an original onto a receiving surface, comprising:

a. means for providing a magnetic field;

b. means for shaping the magnetic field to a substantially linear configuration;

c. electrical means for simultaneously varying the intensity of the linear magnetic field along the length of said line in accordance with the variations of light and shade information contained in the full width of a corresponding line of the original graphic information, and d. toner supply means positioned in juxtaposition to said shaping means and in magnetically attractable relation to said field for causing transfer of a full line of toner material from said toner supply means to the receiving surface in quantities along said line corresponding to the variations of the magnetic filed intensity along said line.

2. The apparatus as in claim 1 and wherein said toner supply means includes magnetic ink contained in a carrier medium, and heating means for maintaining said carrier medium in a liquid state.

3. The apparatus as in claim 1 and wherein said toner supply means includes container means having a narrow linear exit port.

4. The apparatus as in claim 1 and further comprising fixer means for fixing the information onto the receiving surface.

5. The apparatus as in claim 1 and further comprising first drive means for moving the original across said electrical means, and second drive means for moving the receiving surface across the toner supply means, said first and second drive means being in synchronization.

6. The apparatus as in claim 1 and wherein said shaping means comprises:

a copying head including a plurality of electrically conductive and magnetically permeable laminae electrically insulated from each other to form a stack, each of said laminae having first and second terminals, each of said laminae having a reduced area section between said terminals, forming said magnetic field of linear configuration, and wherein said electrical means comprises a source of electrical energy for connection across each of said terminals and a photo-responsive element in series circuit relationship with each of said laminae and said source of energy.

7. The apparatus as in claim 6 and wherein said laminae are permanently magnetized.

8. The apparatus as in claim 6 and wherein each of the laminae are separated from each other by a sheet of electrical insulating material.

9. The apparatus as in claim 6 and wherein each of the laminae are separated from each other by an electrically insulating lacquer.

10. The apparatus as in claim 6 and further comprising magnetic energization means for providing said magnetic field.

11. The apparatus as in claim 10 and wherein said magnetic energization means comprises electrically energized coil means wound on said stack.

12. The apparatus as in claim 10 and wherein said magnetic energization means comprises magnetic means positioned with respect to said stack for providing a magnetic field therein.

13. The apparatus as in claim 6 and wherein each of said laminae comprises a body portion and a head portion extending from said body portion, the transverse dimension of the body portion progressively reducing to form a tip portion, a slot bisecting said head portion and substantially most of said body portion and terminating just short of said tip to form a small bridging portion of laminae material between the end of said slot and said tip, said bridging portion forming said reduced section.

14. The apparatus as in claim 13 and wherein each of said laminae further includes tongues laterally projecting from both sides of said head portion, said photo-responsive means being coupled to one of said tongues.

15. The apparatus as in claim 14 and further comprising a bus bar interconnecting a respective tongue of each of the laminae.

16. The apparatus as in claim 6 further comprising means for focusing an image of the graphic information from the original onto said photo-responsive means.

17. The apparatus as in claim 16 and wherein said energy supply is a source of DC voltage.

18. The apparatus as in claim 16 and wherein said energy supply is a source of AC voltage.

19. The apparatus as in claim 16 and wherein said energy is a source of pulsed voltage of suitable waveform.

20. The apparatus as in claim 16 and wherein said photo-responsive means is a single photo-responsive element extending laterally across the entire copying head.

21. The apparatus as in claim 20 and wherein said photo-responsive means has a high conductivity in the direction of the plane of the laminae than in any other direction.

22. The apparatus as in claim 20 and wherein said photo-responsive means is of a doped single crystal cadmium sulfide material.

23. The apparatus as in claim 20 and wherein said photo-responsive means is of phototransistor material.

24. A method of imaging, for recording graphic information from a source of information onto a receiving surface, comprising:

a. providing a magnetic field;

b. shaping said magnetic field to substantially linear configuration;

c. varying the intensity of said magnetic field along said line in accordance with information contained in a corresponding line of the information source;

d. disposing magnetically attractable toner material in magnetically attractable relation to said field;

e. interposing a receiving medium between said field and said toner supply whereby toner material is transferred to said receiving medium in a quantity corresponding to the variations of the magnetic field intensity along said line;

f. said step of shaping the magnetic field comprising passing the magnetic field through a stack containing a plurality of magnetically permeable and electrically conductive laminae insulated from each other and formed with a tip portion having a reduced area section;

g. said step of varying the intensity of the magnetic field, further comprising:

h. forming a series circuit between a photo-responsive means, an energy source, and each of the laminae, and i. focusing an image of the graphic information onto the photo-responsive means to cause a current to pass through the restricted area corresponding to the light and shade pattern of the image.

25. The method as in claim 24 and further comprising fixing the toner deposited onto the receiving surface.

26. The method as in claim 24 and further comprising, maintaining the toner supply in a liquid state while permitting the toner to solidify upon contact with the receiving surface.

27. An imaging apparatus for recording the content of the full width of a line of graphic information derived from an original onto a receiving surface, comprising:

a. means for illuminating, in full width, a line of graphic information appearing on a sheet of original source material;

b. means for optically focusing the content of the full width of said illuminated line onto a photo-responsive means as a line of light and shade corresponding to the line of original graphic information;

c. means for providing a magnetic field and shaping the source to substantially linear configuration corresponding in width to the full width of the line to be recorded on a receiving surface;

d. electrical means coacting with said photo-responsive means for controlling the intensity of portions of said linear magnetic field in accordance with the light and shade portions of the corresponding line of original graphic information;

e. toner supply means positioned in juxtaposition to said shaping means, and in magnetically attractable relation to said linear field for causing the transfer of a line of toner material from said toner supply means in a quantity corresponding to the variations of the intensity of the linear magnetic field along said entire line.

* * * * *